United States Patent
Geib et al.

(10) Patent No.: US 6,874,754 B2
(45) Date of Patent: Apr. 5, 2005

(54) APPARATUS FOR PREVENTING VALVE STEM COKING

(75) Inventors: Todd P. Geib, Fairport, NY (US); Craig D. Smith, Penfield, NY (US); Christopher D. Marlowe, Henrietta, NY (US); Mark A. Reeves, Hamlin, NY (US); Jerry L. Kelly, Rochester, NY (US); Mahoro M. Fujita, Fairport, NY (US); Mark S. Lockwood, Victor, NY (US); Paul L. Gluchowski, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 174 days.

(21) Appl. No.: 10/230,912

(22) Filed: Aug. 29, 2002

(65) Prior Publication Data

US 2004/0041115 A1 Mar. 4, 2004

(51) Int. Cl.[7] ............................................. F16K 31/44
(52) U.S. Cl. ................................. 251/214; 123/528.11
(58) Field of Search ................................. 251/214, 355, 251/330; 137/546; 123/528.11

(56) References Cited

U.S. PATENT DOCUMENTS

| | | | | |
|---|---|---|---|---|
| 372,200 A | * | 10/1887 | Briggs | 251/214 |
| 489,324 A | * | 1/1893 | Patterson | 137/505.18 |
| 2,765,185 A | * | 10/1956 | Mott | 277/529 |
| 3,188,048 A | * | 6/1965 | Sutherland | 277/532 |
| 3,800,817 A | * | 4/1974 | Gropp et al. | 137/242 |
| 4,061,157 A | | 12/1977 | Hanssen | |
| 4,082,105 A | * | 4/1978 | Allen | 137/72 |
| 4,106,170 A | * | 8/1978 | Schoeneweis | 29/890.124 |
| 4,253,642 A | | 3/1981 | Adams | |
| 4,408,627 A | | 10/1983 | Harris | |
| 5,511,531 A | | 4/1996 | Cook et al. | |
| 5,666,932 A | | 9/1997 | Bauerle et al. | |
| 6,212,881 B1 | | 4/2001 | Takahashi et al. | |
| 6,453,934 B1 | | 9/2002 | Bircann et al. | |
| 6,543,746 B2 | | 4/2003 | Bircann et al. | |
| 6,601,823 B2 | * | 8/2003 | Newberg | 251/144 |

* cited by examiner

*Primary Examiner*—J. Casimer Jacyna
(74) *Attorney, Agent, or Firm*—Patrick M. Griffin

(57) ABSTRACT

An exhaust gas recirculation valve having a reciprocating pintle shaft supported by a sleeve bushing and having a labyrinthine pathway between a valve operating chamber and a shaft/bushing interface to minimize intrusion of exhaust gases into the interface. The labyrinthine pathway is formed between fixed annular elements of the valve body and shaft bushing and a movable annular element of the valve head telescopically disposed between the fixed elements.

5 Claims, 2 Drawing Sheets

APPARATUS FOR PREVENTING VALVE STEM COKING

TECHNICAL FIELD

The present invention relates to pintle valves; more particularly, to exhaust gas recirculation (EGR) pintle valves for internal combustion engines; and most particularly, to apparatus for preventing fouling of the pintle shaft and pintle bushing by exhaust gas components.

BACKGROUND OF THE INVENTION

Pintle valves are well known for use in controlling flow of fluids, and especially gases. Some applications can expose a valve's internal surfaces and moving parts to fouling materials which can give rise to deposits, resulting in impaired action or outright failure of the valve. In a particularly severe application, exhaust gas recirculation pintle valves on internal combustion engines are known to accumulate coking deposits on the pintle shaft in the region of the pintle support bushing. Having this area of the pintle unobstructed is a requirement for smooth, reliable action of the valve in controlling exhaust gas flow.

It is known in the art to provide means for causing the pintle shaft to be scraped clean inherently by the axial motion of the shaft as the valve is exercised. Such means typically are disposed upstream of the sensitive area, such as a shaft bushing or a valve actuator.

U.S. Pat. No. 5,511,531, issued Apr. 30, 1996, discloses an annular scraper element 74 for the purpose of scraping off any residue that may accumulate on shaft 60 so that such residue is prevented from passing onto actuator 12. At its center, scraper element 74 has a circular hole with which shaft 60 has a close sliding fit. The radially outer margin of element 74 is captured such that it is constrained against any significant axial motion. A problem with such a scraper is that it represents essentially a line contact around the shaft, and any material that escapes past that line is then free to migrate or be deposited further along the shaft and/or within the actuator. Further, scraper element 74 has no radial resilience and is subject to wear with use, such that its scraping action becomes progressively less effective over time. Also, without radial resilience, any assembly axial misalignment between element 74 and shaft 60 could lead to erratic operation or binding of the shaft.

U.S. Pat. No. 4,253,642, issued Mar. 3, 1981, discloses an arrangement of wire bristles impinging radially on a rotational valve shaft "to clean threads or the like of the valve stem and remove debris therefrom." A problem with using wire bristles is that, while the shaft may be scrubbed thereby, the bristle pattern is entirely porous, allowing particulate-laden gases to permeate through and cause coking downstream of the bristles. If the disclosed bristled device was used in an axially actuating valve, and no means for introducing radial resilience of the device was provided, erratic operation and binding of the shaft as discussed above could result.

U.S. Pat. No. 6,212,881 B1, issued Apr. 10, 2001, discloses a "stopper" 72 (FIG. 6) having a central hole 72b through which the valve pintle shaft 56a passes. The diameter of the hole 72b is slightly larger than the diameter of shaft 56a. When the valve shaft is moved axially, the inner surface of the hole removes foreign matter such as deposits from the surface of the valve shaft. This is substantially the same line-contact scraper mechanism as is disclosed in U.S. Pat. No. 5,511,531 discussed above and thus has the same drawbacks as discussed previously.

U.S. Pat. No. 5,666,932 discloses a programmed feature of an engine start-up cycle wherein the EGR valve is violently opened and then slammed closed, which purports to jar or shear any contaminant buildup so as to reduce such buildup. No contact means is disclosed for actively scraping or otherwise mechanically removing contaminant buildup.

U.S. Pat. No. 4,408,627, issued Oct. 11, 1983, discloses a gate-type EGR valve operated by a linear actuator attached to a valve shaft. A pair of nylon scraper rings 28,29 are positioned around the valve shaft "to remove any carbon deposits" from the valve shaft and prevent them from entering the actuator. The rings are separated by a compressed coil spring which urges the rings against respective axial sealing faces in the valve body. While some radial resilience of the scraper means may be provided, the scrapers remain subject to wear with use and degradation of effectiveness over time.

U.S. Pat. No. 4,061,157, issued Dec. 6, 1977, discloses a reciprocating valve having an outwardly facing conical surface disposed about the valve stem, which surface terminates in a knife-like edge that functions to remove accumulations of foreign material from exposed portions of the valve stem as it oscillates past the edge. The same inherent tendencies to bind or stick the stem if not properly aligned or to degrade over time exist in this design.

What is needed in the art is a means for keeping gas-borne contaminants from reaching bearing surfaces of a valve pintle shaft and its support bushing, and for limiting buildup of contaminants on a valve pintle shaft.

It is a principal object of the present invention to increase the reliability of an exhaust gas recirculation valve by preventing buildup of deposits on bearing surfaces thereof.

SUMMARY OF THE INVENTION

Briefly described, in an exhaust gas recirculation valve having a reciprocating pintle shaft supported by a sleeve bushing, a labyrinthine pathway is created between a valve operating chamber and a shaft/bushing interface to minimize intrusion of exhaust gases into the interface. The labyrinthine pathway is formed between radially spaced-apart fixed annular elements of the valve body and shaft bushing and a movable annular element of the valve head telescopically disposed between the fixed elements.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
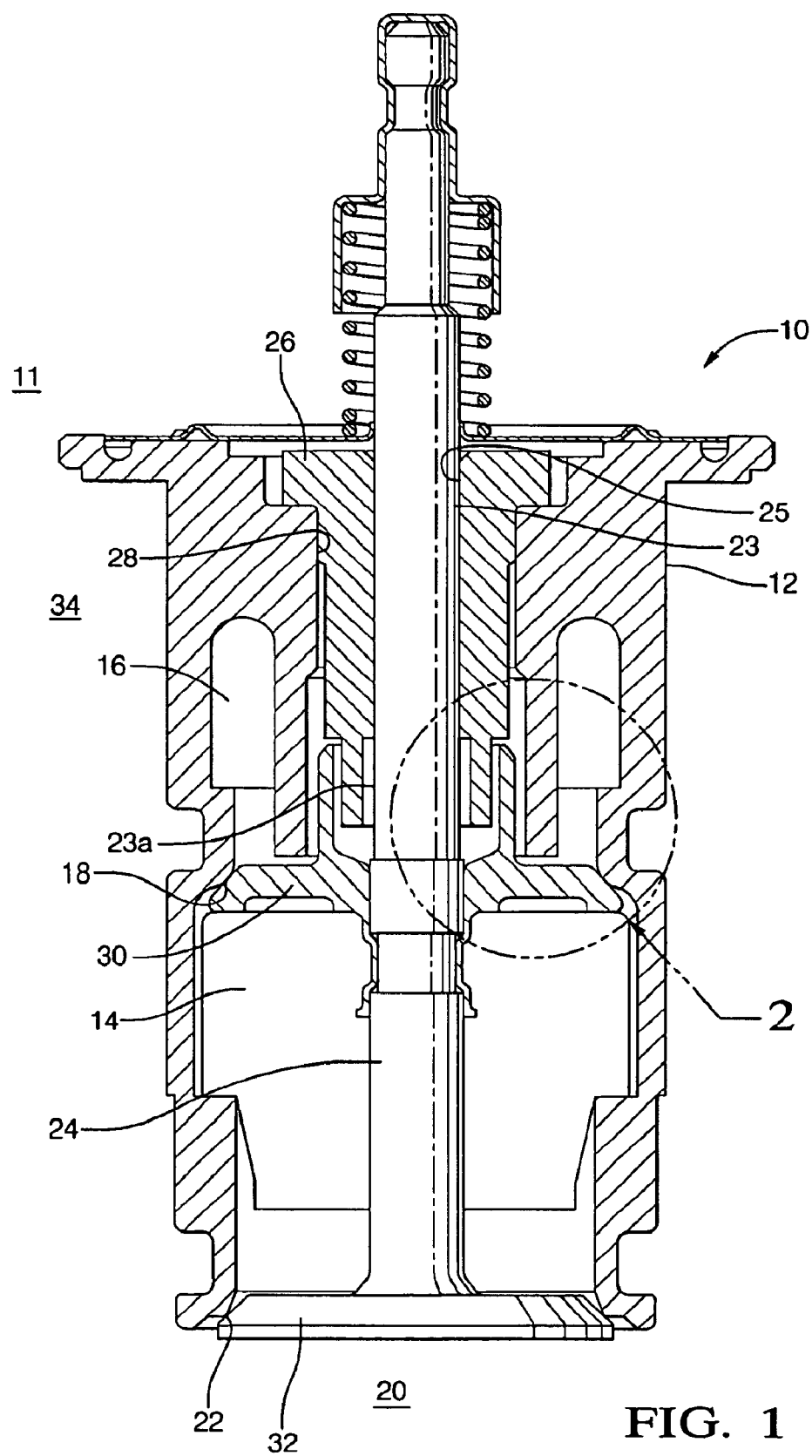
FIG. 1 is an elevational cross-sectional view of a pintle-type valve in accordance with the invention.
Figure 2:
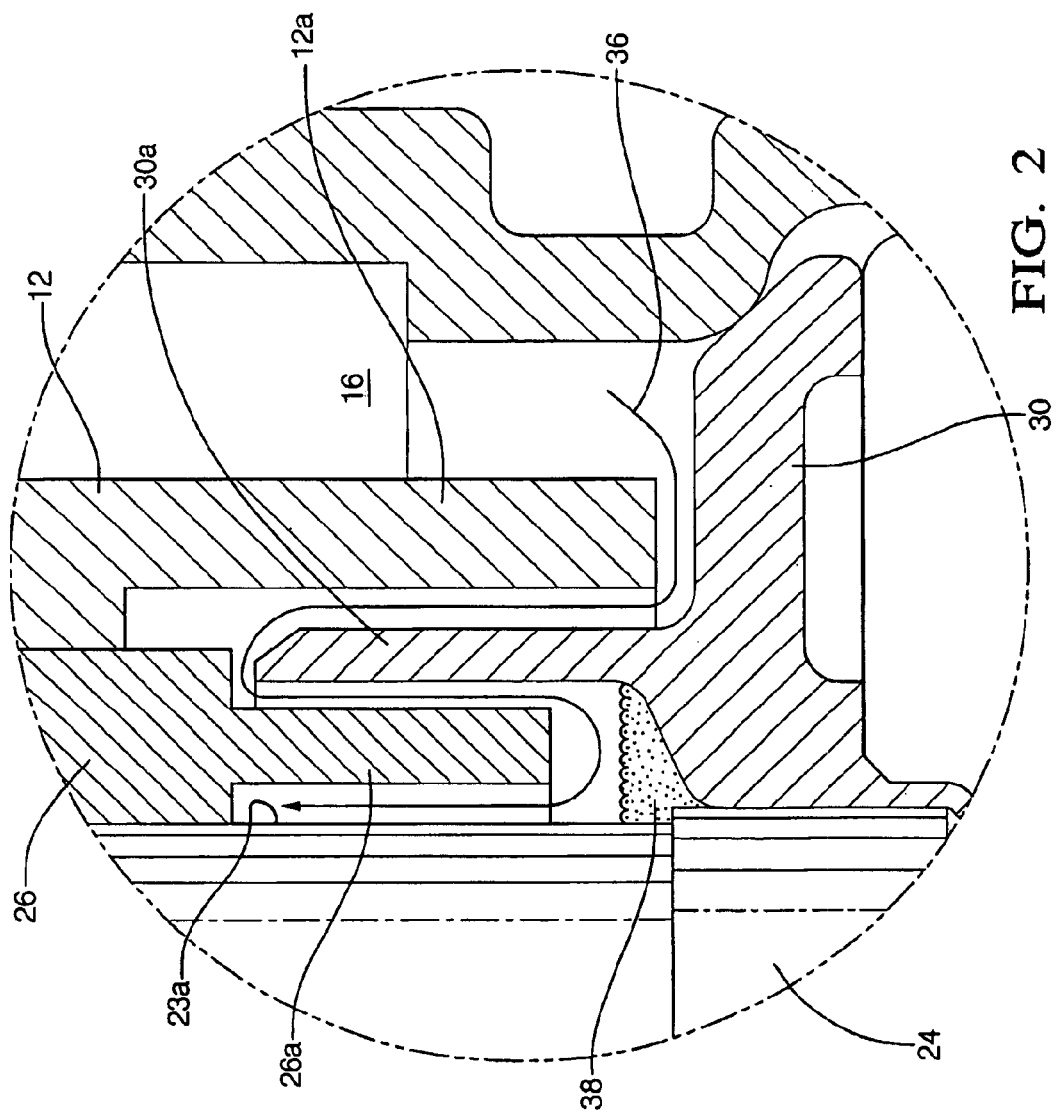
FIG. 2 is a detailed view of area 2 shown in FIG. 1.

Referring to FIGS. 1 and 2, a pintle-type valve 10 in accordance with the invention includes a valve body 12 comprising a first annular chamber 14 and a second annular chamber 16 separated by a first annular valve seat 18. Chamber 14 is separated from the exterior 20 by a second annular valve seat 22. A pintle shaft 24 having a surface 23 is slidably disposed in first axial bore 25 in bushing 26 which is mounted in a second axial bore 28 in valve body 12. First valve head 30 is fixedly attached to shaft 24 for axial movement therewith and is matable with first valve seat 18 to regulate flow across seat 18 in known fashion. Second valve head 32 is integral with shaft 24 and is matable with second valve seat 22 for regulating flow across seat 22 in known fashion, in concert with first head 30 and first seat 18. For purposes of discussion of the invention, second seat 22 and second head 32 need not be considered further hereinafter.

A pintle valve such as valve 10 may be mounted on an internal combustion engine 34 for use as an exhaust gas recirculation valve in known fashion. In such use, chambers 14 and 16 are fully exposed to engine exhaust gases. The purpose of the invention is to provide a long, labyrinthine pathway to inhibit migration of gases from chamber 16 to an area 23a of shaft surface 23, which area is subject to reciprocation into and out of bushing 26 during operation of the valve. It is an important operating consideration that area 23a be kept free of coking deposits.

Referring to FIG. 2, valve body 12 along the inner wall of chamber 16 is provided with a fixed annular projection 12a extending axially toward valve head 30. Bushing 26 is similarly provided with a fixed annular projection 26a extending axially toward valve head 18 and off-spaced radially from projection 12a. Valve head 30 is provided with an annular projection 30a which extends concentrically between projections 12a and 26a, creating a relatively long labyrinthine pathway 36 from chamber 16 to surface portion 23a, and which moves axially and telescopically of the fixed projections during actuation of the valve. Preferably, the annular clearances between projections 12a and 18a, and between 18a and 26a, are on the order of a few thousandths of an inch. An additional advantage of a telescopic arrangement is that the projections present a relatively large surface area for accommodating any coking deposits, thereby minimizing coking which might otherwise form on surface area 23a.

Preferably, head 30 is formed such that an annular well 38 is formed with shaft 24 wherein vapor condensate may temporarily accumulate.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A pintle type valve, comprising:
  a) a valve body containing at least one chamber;
  b) a valve pintle shaft axially disposed in said valve body and extending into said at least one chamber;
  c) a valve head disposed on said shaft for movement therewith for closing said at least one chamber;
  d) a first annular projection formed on said valve body extending in said chamber toward said valve head; and
  e) a second annular projection formed on and extending axially of said valve head and moveable therewith telescopically between said first annular projection and said shaft to form a first labyrinthine passageway between said chamber and said shaft.

2. A pintle type valve in accordance with claim 1 further comprising a bushing disposed in a bore in said valve body, said bushing having an axial bore for slidably receiving and guiding said pintle shaft.

3. A pintle type valve in accordance with claim 2 wherein said bushing has a fixed third annular projection extending toward said valve head between said second annular projection and said shaft to form an additional labyrinthine passageway.

4. A pintle type valve in accordance with claim 1 further comprising an annular well formed in said valve head for receiving exhaust gas condensate.

5. An internal combustion engine, comprising a pintle-type exhaust gas recirculation valve having
  a valve body containing at least one chamber,
  a valve pintle shaft axially disposed in said valve body and extending into said at least one chamber,
  a valve head disposed on said shaft for movement therewith for closing said at least one chamber,
  a first annular projection formed on said valve body extending in said chamber toward said valve head, and
  a second annular projection formed on and extending axially of said valve head and moveable therewith telescopically between said first annular projection and said shaft to form a first labyrinthine passageway between said chamber and said shaft.

* * * * *